(12) United States Patent
Homma et al.

(10) Patent No.: US 9,167,829 B2
(45) Date of Patent: *Oct. 27, 2015

(54) OIL/FAT COMPOSITION

(75) Inventors: Rika Homma, Utsunomiya (JP); Yoshihide Asabu, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/240,295

(22) PCT Filed: Aug. 21, 2012

(86) PCT No.: PCT/JP2012/071085
§ 371 (c)(1),
(2), (4) Date: Feb. 21, 2014

(87) PCT Pub. No.: WO2013/027727
PCT Pub. Date: Feb. 28, 2013

(65) Prior Publication Data
US 2014/0205736 A1    Jul. 24, 2014

(30) Foreign Application Priority Data

Aug. 22, 2011 (JP) .................. 2011-180780

(51) Int. Cl.
*A23D 9/013* (2006.01)
*A23D 7/01* (2006.01)

(52) U.S. Cl.
CPC ................ *A23D 7/011* (2013.01); *A23D 7/013* (2013.01); *A23D 9/013* (2013.01)

(58) Field of Classification Search
IPC .................. A23D 7/011,9/013, 7/013
See application file for complete search history.

(56) References Cited

U.S. PATENT DOCUMENTS

| | | | | |
|---|---|---|---|---|
| 5,879,735 A * | 3/1999 | Cain et al. | ...... | 426/603 |
| 5,891,495 A * | 4/1999 | Cain et al. | ...... | 426/101 |
| 5,912,042 A | 6/1999 | Cain et al. | | |
| 6,004,611 A | 12/1999 | Gotoh et al. | | |
| 6,022,579 A * | 2/2000 | Mori et al. | ...... | 426/603 |
| 7,691,428 B2 | 4/2010 | Skogerson et al. | | |
| 2005/0214434 A1 | 9/2005 | Yoon et al. | | |
| 2007/0243308 A1 | 10/2007 | Yu et al. | | |
| 2009/0123635 A1 | 5/2009 | Klemann et al. | | |
| 2009/0246299 A1 | 10/2009 | Yoon et al. | | |
| 2012/0259133 A1 | 10/2012 | Homma et al. | | |
| 2013/0023684 A1 | 1/2013 | Moriwaki et al. | | |
| 2013/0230630 A1 | 9/2013 | Homma et al. | | |
| 2013/0280407 A1 | 10/2013 | Homma et al. | | |

FOREIGN PATENT DOCUMENTS

| | | |
|---|---|---|
| CN | 1292644 A | 4/2001 |
| CN | 1294493 A | 5/2001 |
| CN | 1507788 A | 6/2004 |
| CN | 1303054 C | 3/2007 |
| EP | 0 744 899 | 12/1996 |
| EP | 0 744 900 | 12/1996 |
| JP | 63 301743 | 12/1988 |
| JP | 4 300826 | 10/1992 |
| JP | 10 176181 | 6/1998 |
| JP | 11 243855 | 9/1999 |
| JP | 2001 178361 | 7/2001 |
| JP | 2004 105116 | 4/2004 |
| JP | 2006 513307 | 4/2006 |
| JP | 2007 14263 | 1/2007 |
| JP | 2009 114450 | 5/2009 |
| JP | 4381362 | 12/2009 |
| WO | WO 95/22256 A1 | 8/1995 |
| WO | WO 95/29596 A1 | 11/1995 |
| WO | WO 99/59422 A1 | 11/1999 |
| WO | WO 99/59424 A1 | 11/1999 |

OTHER PUBLICATIONS

U.S. Appl. No. 14/240,214, filed Feb. 21, 2014, Homma et al.
U.S. Appl. No. 14/347,888, filed Mar. 27, 2014, Homma et al.
U.S. Appl. No. 14/347,915, filed Mar. 27, 2014, Homma et al.
U.S. Appl. No. 14/240,206, filed Feb. 21, 2014, Homma et al.
U.S. Appl. No. 14/240,248, filed Feb. 21, 2014, Homma et al.
U.S. Appl. No. 14/240,209, filed Feb. 21, 2014, Homma et al.
International Search Report Issued Nov. 6, 2012 in PCT/JP12/071085 Filed Aug. 21, 2012.
English translation of the International Preliminary Report on Patentability and Written Opinion issued Mar. 6, 2014 in PCT/JP2012/071085, filed Aug. 21, 2012.
U.S. Appl. No. 14/350,955, filed Apr. 10, 2014, Homma.
Extended European Search Report issued Apr. 10, 2015 in Patent Application No. 12826246.6.

* cited by examiner

*Primary Examiner* — Chhaya Sayala
(74) *Attorney, Agent, or Firm* — Oblon, McClelland, Maier & Neusatdt, L.L.P.

(57) ABSTRACT

Provided is a fat or oil composition, comprising 50 mass % or more of diacylglycerols satisfying the following (1) to (3):
(1) from 5 to 50 mass % of a disaturated diacylglycerol (SS) in the diacylglycerols;
(2) 35 mass % or less of a monosaturated-monounsaturated diacylglycerol (SU) in the diacylglycerols; and
(3) 1.5 or less as a ratio (mass ratio) [(SS)/(UU)] of a content of the disaturated diacylglycerol (SS) in the diacylglycerols relative to a content of a diunsaturated diacylglycerol (UU) in the diacylglycerols.

19 Claims, No Drawings

OIL/FAT COMPOSITION

FIELD OF THE INVENTION

The present invention relates to a fat or oil composition, which is suited for a fat or oil to be kneaded in confectionery production, bread production, or the like.

BACKGROUND OF THE INVENTION

A fat or oil composition such as shortening and a water-in-oil emulsion such as margarine have characteristics such as high resistance to propagation of microorganisms, excellent shape-retaining property, and a long shelf life, and are widely used for confectionery production, bread production, or the like. However, on the other hand, each of the composition and emulsion has a disadvantage of being poor in melt-in-the-mouth feeling because of its high solid fat content. When the solid fat content is reduced to overcome the disadvantage, the fat or oil becomes softer, and is liable to cause problems in preservation stability such as deterioration of external appearance and oil separation due to crystallization during preservation.

As technologies for overcoming the disadvantages, there have been reported, for example, a method involving adding a specific emulsifier (Patent Document 1), a water-in-oil emulsified fat or oil composition obtained by mixing and emulsifying an oil phase containing a diglyceride having a melting point (softening point) of less than 20° C. and an aqueous phase (Patent Document 2), and a water-in-oil emulsified fat or oil composition including an oil phase and an aqueous phase, in which the oil phase has composition including a diglyceride and a triglyceride, and the diglyceride has composition satisfying a predetermined requirement (Patent Document 3), or the like.

CITATION LIST

Patent Document

[Patent Document 1] JP-A-2001-178361
[Patent Document 2] JP-A-63-301743
[Patent Document 3] JP-A-11-243855
[Patent Document 4] JP-A-4-300826
[Patent Document 5] JP-A-10-176181

SUMMARY OF THE INVENTION

The present invention relates to a fat or oil composition, comprising 50 mass % or more of diacylglycerols satisfying the following (1) to (3):

(1) 5 to 50 mass % of a disaturated diacylglycerol (SS) in the diacylglycerols;
(2) 35 mass % or less of a monosaturated-monounsaturated diacylglycerol (SU) in the diacylglycerols; and
(3) 1.5 or less as a ratio (mass ratio) [(SS)/(UU)] of the content of the disaturated diacylglycerol (SS) in the diacylglycerols relative to the content of a diunsaturated diacylglycerol (UU) in the diacylglycerols.

The present invention also provides a water-in-oil emulsion, comprising the fat or oil composition, and having a mass ratio between an oil phase and an aqueous phase of from 10:90 to 90:10.

DETAILED DESCRIPTION OF OUT THE INVENTION

A fat or oil containing at a high concentration is known to have physiological effects such as suppression of an increase in triglycerides (neutral fats) in blood after meal and a less accumulation in the body (Patent Documents 4 and 5), and hence is expected to be used instead of conventional fats or oils in fat or oil-rich foods such as shortening and margarine. However, the conventional fat or oil containing diacylglycerols has a problem of insufficient preservation stability.

Further, in recent years, a saturated fatty acid has been reported to increase an LDL (bad) cholesterol value and to raise a risk of coronary heart disease. Therefore, reduction of the content of the saturated fatty acid in an edible oil has been required throughout the world. However, the saturated fatty acid is important for maintaining the hardness of the shortening or the like necessary for the confectionery production and bread production, and it is difficult to reduce the content of the saturated fatty acid by conventional technologies.

The present invention is to provide a fat or oil composition that is excellent in preservation stability, can be used for a raw material fat or oil for shortening, margarine, or the like, and has a high content of diacylglycerol.

The inventors of the present invention made intensive studies to search a fat or oil suited for shortening, margarine, or the like with focusing attention on the ratio of a diacylglycerol having a specific structure in diacylglycerols, and as a result, found that, when each of the contents of a diacylglycerol including only a saturated fatty acid and a diacylglycerol including a saturated fatty acid and an unsaturated fatty acid is adjusted within a predetermined range, it is possible to produce a fat or oil composition that has an appropriate hardness despite the low content of the saturated fatty acid, hardly causes deterioration of external appearance and oil separation due to crystallization during preservation, is excellent in stability, and has satisfactory performance as a fat or oil to be kneaded in confectionery production, bread production, or the like.

According to the present invention, it is possible to produce a diacylglycerol-rich fat or oil composition that has an appropriate hardness despite the low content of a saturated fatty acid, hardly causes deterioration of external appearance and oil separation due to crystallization during preservation, and has satisfactory performance as a fat or oil to be mixed in confectionery production, bread production, or the like.

The fat or oil composition according to the present invention contains 50 mass % or more (hereinafter referred to as "%"), preferably 65% or more, more preferably 70% or more, more preferably 75% or more, even more preferably 80% or more, and preferably 95% or less, more preferably 90% or less, even more preferably 85% or less of the diacylglycerols. Specifically, the fat or oil composition contains preferably from 65 to 95%, more preferably from 70 to 95%, more preferably from 75 to 95%, more preferably from 75 to 90%, even more preferably from 80 to 85% of the diacylglycerols. The content of the diacylglycerols that falls within the above-mentioned range is preferred from the viewpoints of physiological effects, improving the texture in confectionery production, bread production, or the like, and satisfactory oil-off resistance. It should be noted that, in the present invention, the "fat or oil" contains any one or more of triacylglycerol, diacylglycerol, and monoacylglycerol.

The diacylglycerols in the present invention satisfy the following (1) to (3):

(1) 5 to 50% of a disaturated diacylglycerol (SS) in the diacylglycerols;
(2) 35% or less of a monosaturated-monounsaturated diacylglycerol (SU) in the diacylglycerols; and
(3) 1.5 or less as a ratio (mass ratio) [(SS)/(UU)] of the content of the disaturated diacylglycerol (SS) in the diacylglycerols relative to the content of a diunsaturated diacylglycerol (UU) in the diacylglycerols.

In the diacylglycerols, the content of the disaturated diacylglycerol (SS), whose constituent fatty acids include two saturated fatty acid residues, is from 5 to 50%, preferably 5% or more, more preferably 8% or more, more preferably 10% or more, even more preferably 12% or more, and is preferably 48% or less, more preferably 40% or less, more preferably 38% or less, more preferably 35% or less, even more preferably 30% or less. Specifically, the content is preferably from 5 to 48%, more preferably from 5 to 40%, more preferably from 5 to 38%, more preferably from 5 to 35%, more preferably from 8 to 30%, more preferably from 10 to 30%, even more preferably from 12 to 30%. The content of SS that falls within the above-mentioned range is preferred from the viewpoints of improving the external appearance during preservation and improving the melt-in-the-mouth feeling of confectionery, bread, or the like to be produced. The saturated fatty acids each have preferably from 14 to 24 carbon atoms, more preferably from 16 to 22 carbon atoms.

In the diacylglycerols, the content of the monosaturated-monounsaturated diacylglycerol (SU), whose constituent fatty acids include a saturated fatty acid residue and an unsaturated fatty acid residue, is 35% or less, preferably 30% or less, more preferably 25% or less, more preferably 20% or less, even more preferably 15% or less. The lower limit of the content of SU, which may be 0, is preferably 5% or more, more preferably 10% or more, even more preferably 12% or more. Specifically, the content is preferably from 0 to 30%, more preferably from 0 to 25%, more preferably from 0 to 20%, more preferably from 0 to 15%, more preferably from 5 to 15%, more preferably from 10 to 15%, even more preferably from 12 to 15%. The content of SU that falls within the above-mentioned range is preferred from the viewpoint of satisfactory workability at the time of production such as confectionery production or bread production. The unsaturated fatty acids each have preferably from 14 to 24 carbon atoms, more preferably from 16 to 22 carbon atoms, from the viewpoint of physiological effects.

Further, in the diacylglycerols, the content of the diunsaturated diacylglycerol (UU), whose constituent fatty acids include two unsaturated fatty acid residues, is not particularly limited, but is preferably 35% or more, more preferably 40% or more, more preferably 45% or more, more preferably 50% or more, more preferably 55% or more, even more preferably 58% or more, and is preferably 95% or less, more preferably 90% or less, more preferably 87% or less, more preferably 85% or less, more preferably 80% or less, more preferably 75% or less, even more preferably 72% or less. Specifically, the content is preferably from 35 to 95%, more preferably from 40 to 90%, more preferably from 45 to 90%, more preferably from 50 to 90%, more preferably from 55 to 87%, more preferably from 55 to 85%, more preferably from 55 to 80%, more preferably from 55 to 75%, even more preferably from 58 to 72%. The content of UU that falls within the above-mentioned range is preferred from the viewpoint of physiological effects and the viewpoint of satisfactory workability at the time of production such as confectionery production or bread production.

The positions of the saturated fatty acid(s) and/or the unsaturated fatty acid(s) constituting each of the diacylglycerols may be the 1-position and 3-position of glycerol, or may be the 1-position and 2-position of glycerol.

In the diacylglycerols, the mass ratio [(SS)/(UU)] of the content of the disaturated diacylglycerol (SS) relative to the content of the diunsaturated diacylglycerol (UU) is 1.5 or less, preferably 1.2 or less, more preferably 1 or less, more preferably 0.9 or less, more preferably 0.8 or less, more preferably 0.75 or less, more preferably 0.7 or less, more preferably 0.6 or less, even more preferably 0.5 or less. The lower limit of the ratio (SS)/(UU) is preferably 0.01 or more, more preferably 0.02 or more, more preferably 0.03 or more, more preferably 0.05 or more, more preferably 0.1 or more, even more preferably 0.15 or more. Specifically, the ratio is preferably from 0.01 to 1.2, more preferably from 0.02 to 1.2, more preferably from 0.03 to 1, more preferably from 0.03 to 0.9, more preferably from 0.03 to 0.8, more preferably from 0.05 to 0.75, more preferably from 0.1 to 0.7, more preferably from 0.15 to 0.6, even more preferably from 0.15 to 0.5. The ratio (SS)/(UU) that falls within the above-mentioned range is preferred from the viewpoint of improving the melt-in-the-mouth feeling of confectionery, bread, or the like to be produced.

The fat or oil composition in the present invention contains preferably from 1 to 49%, more preferably from 5 to 40%, more preferably from 5 to 35%, more preferably from 5 to 34.9%, more preferably from 5 to 30%, more preferably from 5 to 25%, more preferably from 5 to 24.9%, even more preferably from 5 to 20% of the triacylglycerols, from the viewpoints of physiological effects and industrial productivity.

The triacylglycerols preferably include a triacylglycerol (SSS), whose constituent fatty acids include only saturated fatty acid residues, a triacylglycerol (SSU), whose constituent fatty acids include two saturated fatty acid residues and one unsaturated fatty acid residue, and a triacylglycerol (SUU), whose constituent fatty acids include one saturated fatty acid residue and two unsaturated fatty acid residues.

The mass ratio [(SSS)/(SSU+SUU)] of the content of SSS relative to the total content of SSU and SUU, in the triacylglycerols is preferably 0.4 or more from the viewpoint of preventing oil separation, and is more preferably 0.5 or more, more preferably 0.6 or more, more preferably 0.8 or more, even more preferably 1 or more. The upper limit of the ratio is preferably 50 or less, more preferably 45 or less, more preferably 40 or less, more preferably 35 or less, more preferably 30 or less, even more preferably 10 or less. Specifically, the ratio is preferably from 0.4 to 50, more preferably from 0.5 to 45, more preferably from 0.6 to 40, more preferably from 0.8 to 35, more preferably from 1 to 35, more preferably from 1 to 30, even more preferably from 1 to 10.

In addition, in the fat or oil composition, the content of monoacylglycerols is preferably 10% or less, more preferably from 0.01 to 8%, and the content of free fatty acids (salts) is preferably 3.5% or less, more preferably from 0.01 to 1.5%, from the viewpoint of a taste and flavor or the like. The constituent fatty acids of the monoacylglycerols are preferably the same as the constituent fatty acids of the diacylglycerols, from the viewpoints of physiological effects and the industrial productivity of the fat or oil.

The consistency of the fat or oil composition according to the present invention is preferably from 30 to 250, more preferably from 50 to 220, from the viewpoint of ease of kneading in confectionery production, bread production, or the like. It should be noted that the "consistency" can be determined by the method described in Examples.

The fat or oil composition according to the present invention can be produced by, for example, separately preparing a fat or oil containing a high concentration of the disaturated diacylglycerol (SS), which includes only the saturated fatty acid residues, and a fat or oil containing a high concentration of the diunsaturated diacylglycerol (UU), which includes only the unsaturated fatty acid residues, respectively, and blending the fats or oils so that the diacylglycerols have the above-mentioned specific composition. Further, if necessary, a usual edible fat or oil may be blended.

The edible fat or oil may be any of a plant-derived fat or oil and an animal-derived fat or oil. A specific raw material therefor may be exemplified by: plant-derived fats or oils such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; and animal-derived fats or oils such as fish oil, lard, beef tallow, and butter fat. In addition, fats or oils such as transesterified oils, hydrogenated oils, and fractionated oils thereof may be used. In the case of using the hydrogenated oil, a fully hardened oil is preferably used because the content of a trans unsaturated fatty acid in the total fatty acids constituting the fat or oil can be decreased. The fats or oils may be used singly or may be mixed appropriately before use. Of those, from the viewpoint of usability, a plant-derived fat or oil is preferably used.

A diacylglycerol-containing fat or oil may be obtained through an esterification reaction of a fatty acid and glycerin, a glycerolysis reaction of a fat or oil and glycerin, or the like. From the viewpoint of controlling the fatty acid composition, the diacylglycerol-containing fat or oil is preferably obtained by the esterification reaction of the fatty acid and glycerin.

The esterification reaction and/or the glycerolysis reaction are roughly classified into chemical methods using a chemical catalyst such as an alkali metal or an alloy thereof, or an oxide, hydroxide, or alkoxide having from 1 to 3 carbon atoms of an alkali metal or an alkali earth metal, and enzymatic methods using an enzyme such as a lipase. In particular, the reactions are preferably carried out under enzymatically mild conditions by using a lipase or the like as the catalyst, from the viewpoint of an excellent taste and flavor or the like.

After the esterification reaction and/or the glycerolysis reaction, a purification step usually employed for the fat or oil may be carried out. Specific examples thereof include steps of acid treatment, water washing, decoloration, and deodorization, or the like.

The raw material fat or oil for the fatty acid used in the esterification reaction and the raw material fat or oil used in the glycerolysis reaction may be the fats or oils listed above as the edible fats or oils.

The fat or oil composition according to the present invention preferably contains an antioxidant. The content of the antioxidant in the fat or oil composition is preferably from 0.005 to 0.5%, more preferably from 0.04 to 0.25%, even more preferably from 0.08 to 0.2%, from the viewpoints of, for example, a taste and flavor, oxidation stability, and suppression of coloration. Any antioxidant that is usually used in a food may be used as the antioxidant. It is possible to use, for example, vitamin E, butylhydroxytoluene (BHT), butylhydroxyanisole (BHA), t-butylhydroquinone (TBHQ), vitamin C or derivatives thereof, phospholipids, and natural antioxidants such as a rosemary extract.

The fat or oil composition according to the present invention can be used for a water-in-oil emulsion. A mass ratio between an aqueous phase and an oil phase is not particularly limited, but is preferably "oil phase:aqueous phase"=from 10:90 to 90:10, more preferably "oil phase:aqueous phase"=from 20:80 to 80:20, even more preferably "oil phase:aqueous phase"=from 30:70 to 70:30.

In the case where the fat or oil composition is formed into an emulsion, a component usually used for an emulsion, such as an emulsifier, an antioxidant, a stabilizer, a thickener, a gelling agent, or a surfactant, may be appropriately blended. Further, another fat or oil may be blended in the oil phase in addition to the fat or oil composition according to the present invention. Examples of another fat or oil may include usual animal- and plant-derived edible fats or oils as mentioned above and processed fats or oils.

The consistency of the water-in-oil emulsion is preferably from 30 to 250, more preferably from 50 to 220.

The fat or oil composition according to the present invention is in a solid state at normal temperature (20° C.), and can be applied as an edible fat or oil to a variety of foods and beverages. In particular, the fat or oil composition is suited for a raw material fat or oil for a fat or oil to be kneaded in confectionery production and bread production or the like, such as shortening or margarine, because the composition does not cause deterioration of external appearance and oil separation due to crystallization during preservation, and has an appropriate hardness.

The present invention further discloses the following compositions relating to the above-mentioned embodiments.

<1> A fat or oil composition, comprising 50 mass % or more of diacylglycerols satisfying the following (1) to (3):
   (1) 5 to 50 mass % of a disaturated diacylglycerol (SS) in the diacylglycerols;
   (2) 35 mass % or less of a monosaturated-monounsaturated diacylglycerol (SU) in the diacylglycerols; and
   (3) 1.5 or less as a ratio (mass ratio) [(SS)/(UU)] of the content of the disaturated diacylglycerol (SS) in the diacylglycerols relative to the content of a diunsaturated diacylglycerol (UU) in the diacylglycerols.

<2> The fat or oil composition according to Item <1>, in which the content of the diacylglycerols in the fat or oil composition is 65 mass % or more, preferably 70 mass % or more, more preferably 75 mass % or more, even more preferably 80 mass % or more, and is 95 mass % or less, preferably 90 mass % or less, more preferably 85 mass % or less.

<3> The fat or oil composition according to Item <1> or <2>, in which the content of the disaturated diacylglycerol (SS) in the diacylglycerols is 5 mass % or more, preferably 8 mass % or more, more preferably 10 mass % or more, even more preferably 12 mass % or more, and is 48 mass % or less, preferably 40 mass % or less, more preferably 38 mass % or less, more preferably 35 mass % or less, even more preferably 30 mass % or less.

<4> The fat or oil composition according to any one of Items <1> to <3>, in which the content of the monosaturated-monounsaturated diacylglycerol (SU) in the diacylglycerols is 30 mass % or less, preferably 25 mass % or less, more preferably 20 mass % or less, even more preferably 15 mass % or less, and the lower limit of the content, which may be 0, is preferably 5 mass % or more, more preferably 10 mass % or more, even more preferably 12 mass % or more.

<5> The fat or oil composition according to any one of Items <1> to <4>, in which the content of the diunsaturated diacylglycerol (UU) in the diacylglycerols is 35 mass % or more, preferably 40 mass % or more, more preferably 45 mass % or more, more preferably 50 mass % or more, more preferably 55 mass % or more, even more preferably 58 mass % or more, and is 95 mass % or less, preferably 90 mass % or less, more preferably 87 mass % or less, more preferably 85 mass % or less, more preferably 80 mass % or less, more preferably 75 mass % or less, even more preferably 72 mass % or less.

<6> The fat or oil composition according to any one of Items <1> to <5>, in which the ratio (SS)/(UU) in the diacylglycerols is 1.2 or less, preferably 1 or less, more preferably 0.9 or less, more preferably 0.8 or less, more preferably 0.75 or less, more preferably 0.7 or less, more preferably 0.6 or less, even more preferably 0.5 or less, and the lower limit of the ratio (SS)/(UU) is 0.01 or more, preferably 0.02 or more, more preferably 0.03 or more, more preferably 0.05 or more, more preferably 0.1 or more, even more preferably 0.15 or more.

<7> The fat or oil composition according to any one of Items <1> to <6>, in which constituent fatty acids of the diacylglycerols are fatty acids each having from 14 to 24 carbon atoms, preferably fatty acids each having from 16 to 22 carbon atoms.

<8> The fat or oil composition according to any one of Items <1> to <7>, further comprising from 1 to 49 mass %, preferably from 5 to 40 mass %, more preferably from 5 to 35 mass %, more preferably from 5 to 34.9 mass %, more preferably from 5 to 30 mass %, more preferably from 5 to 25 mass %, more preferably from 5 to 24.9 mass %, even more preferably from 5 to 20 mass % of triacylglycerols.

<9> The fat or oil composition according to Item <8>, in which the triacylglycerols comprises a triacylglycerol (SSS), whose constituent fatty acids include only saturated fatty acid residues, a triacylglycerol (SSU), whose constituent fatty acids include two saturated fatty acid residues and one unsaturated fatty acid residue, and a triacylglycerol (SUU), where constituent fatty acids include one saturated fatty acid residue and two unsaturated fatty acid residues.

<10> The fat or oil composition according to Item <8> or <9>, in which the mass ratio [(SSS)/(SSU+SUU)] of the content of SSS relative to the total content of SSU and SUU, in the triacylglycerols is 0.4 or more, preferably 0.5 or more, more preferably 0.6 or more, more preferably 0.8 or more, even more preferably 1 or more, and is 50 or less, preferably 45 or less, more preferably 40 or less, more preferably 35 or less, more preferably 30 or less, even more preferably 10 or less.

<11> The fat or oil composition according to any one of Items <1> to <10>, further comprising 10 mass % or less, preferably from 0.01 to 8 mass % of monoacylglycerols.

<12> The fat or oil composition according to any one of Items <1> to <11>, further comprising 3.5 mass % or less, preferably from 0.01 to 1.5 mass % of free fatty acids.

<13> The fat or oil composition according to any one of items <1> to <12>, wherein the fat or oil composition has a consistency of from 30 to 250, preferably from 50 to 220.

<14> The fat or oil composition according to any one of Items <1> to <13>, obtained by separately preparing a fat or oil containing a high concentration of the disaturated diacylglycerol (SS), which includes only the saturated fatty acid residues, and a fat or oil containing a high concentration of the diunsaturated diacylglycerol (UU), which includes only the unsaturated fatty acid residues, respectively, blending the fats or oils so that the diacylglycerols have the above-mentioned composition, and if necessary, blending a usual edible fat or oil.

<15> The fat or oil composition according to any one of Items <1> to <14>, further comprising an antioxidant.

<16> The fat or oil composition according to Item <15>, in which the content of the antioxidant is from 0.005 to 0.5 mass %, preferably from 0.04 to 0.25 mass %, more preferably from 0.08 to 0.2 mass %.

<17> A water-in-oil emulsion, comprising the fat or oil composition according to any one of Items <1> to <16>.

<18> The water-in-oil emulsion according to Item <17>, in which the water-in-oil emulsion has a mass ratio between an oil phase and an aqueous phase of "oil phase:aqueous phase"=from 10:90 to 90:10, more preferably "oil phase: aqueous phase"=from 20:80 to 80:20, even more preferably "oil phase:aqueous phase"=from 30:70 to 70:30.

<19> The water-in-oil emulsion according to Item <17> or <18>, in which the water-in-oil emulsion has a consistency of from 30 to 250, preferably from 50 to 220.

<20> The fat or oil composition according to any one of Items <1> to <16>, in which the fat or oil composition is used as a raw material fat or oil for a fat or oil to be kneaded in confectionery production, bread production, or the like, such as shortening or margarine.

EXAMPLES

Analysis Method (i) Composition of Glycerides in Fat or Oil

About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC conditions>
(Conditions 1)
Apparatus: Agilent 6890 Series (manufactured by Agilent Technologies)
Integrator: ChemStation B 02.01 SR2 (manufactured by Agilent Technologies)
Column: DB-1ht (manufactured by Agilent J&W)
Carrier gas: 1.0 mL He/min
Injector: Split (1:50), T=320° C.
Detector: FID, T=350° C.
Oven temperature: increased from 80° C. to 340° C. at 10° C./min and kept for 15 minutes It should be noted that the contents of SS, SU, and UU in the diacylglycerols, and the contents of SSS, SSU, and SUU in the triacylglycerols were determined under Conditions 2.
(Conditions 2)
Apparatus: Agilent 6890 Series (manufactured by Agilent Technologies)
Integrator: ChemStationB 02.01 SR2 (manufactured by Agilent Technologies)
Column: CP, TAP for Triglyceride (manufactured by VARIAN)
Carrier gas: 1.7 mL He/min
Injector: Split (1:50), T=345° C.
Detector: FID, T=355° C.
Oven temperature: kept at 220° C. for 12 minutes, increased to 305° C. at 10° C./min, kept for 15 minutes, increased to 355° C. at 10° C./min, and kept for 30 minutes (ii) Composition of Constituent Fatty Acids in Fat or Oil Fatty acid methyl esters were prepared in accordance with "Preparation method for fatty acid methyl ester (2.4.1.-1996)" described in "Standard Method for Analysis of Fats and Oils" edited by Japan Oil Chemists' Society, and the resultant fat or oil samples were subjected to measurement in accordance with American Oil Chemists. Society Official Method Ce 1f-96 (GLC method).

(iii) Measurement of Consistency

The consistency was measured at 5° C. with a penetrometer RPM-101 manufactured by RIGO Co., Ltd. using a standard plunger and a standard cone (102.5 g).

(Preparation of Fats or Oils A to H)
(1) Fat or oil A 100 parts by mass of soybean extremely hardened oil (Yokozeki Oil & Fat Industries Co., Ltd.) and 40 parts by mass of glycerin were mixed, and the mixture was subjected to a glycerolysis reaction using sodium methylate as a catalyst, thereby obtaining a diacylglycerol (DAG)-containing fat or oil. Fatty acids and monoacylglycerols were removed from the resultant glycerolysis reaction product by distillation, and the resultant was treated with an acid (a 10% aqueous solution of citric acid was added at a concentration of 2% by mass relative to the resultant), washed with water (distilled water five times), and brought into contact with activated clay (GALLEON EARTH V2R, MIZUSAWA INDUSTRIAL CHEMICALS, LTD.), thereby obtaining a decolored oil. Further, the oil was brought into contact with water vapor to deodorize the oil, thereby obtaining a fat or oil A (DAG: 74%).

(2) Fats or Oils B to E 100 parts by mass of a mixed fatty acid of "soybean oil fatty acid:rapeseed oil fatty acid"=7:3 (mass ratio) and 15 parts by mass of glycerin were mixed, and subjected to an esterification reaction with an enzyme, thereby obtaining a DAG-containing fat or oil. Fatty acids and monoacylglycerols were removed from the resultant esterification product by distillation, and the resultant was treated in the same manner as the fat or oil A, thereby obtaining a fat or oil B (DAG: 86%).

In the same manner as the fat or oil B, 100 parts by mass of palm oil fatty acid and 15 parts by mass of glycerin were used to obtain a fat or oil C (DAG: 80%).

In the same manner as the fat or oil B, hydrogenated rapeseed oil (melting point: 31.5° C.) and 15 parts by mass of glycerin were used to obtain a fat or oil D (DAG: 89%).

In the same manner as the fat or oil A, LUNAC P-95 (Kao Corporation) and 15 parts by mass of glycerin were used to obtain a fat or oil E (DAG: 83%).

(3) Fats or Oils F to H

A fat or oil mainly including triacylglycerols (TAG) (fat or oil F: blended oil (Summit Oil Mill Co., Ltd.)), a fat or oil G: RBD palm oil (KECK SENG (MALAYSIA) BERHAD), and a fat or oil H: soybean extremely hardened oil (Yokozeki Oil & Fat Industries Co., Ltd.) were used as fats or oils F, G, and H, respectively.

Table 1 shows analyzed values for the fats or oils A to H.

samples. The external appearance and preservation stability of the fat or oil samples were evaluated. Table 3 shows the results.

(External Appearance)

The fat or oil samples were preserved at 5° C. for 3 months, visually observed, and evaluated for their external appearance during preservation in accordance with the following criteria.
 4: Very smooth and glossy surface
 3: Smooth surface
 2: Slightly rough surface
 1: Rough and coarse surface (Preservation Stability)

The fat or oil samples were preserved at 5° C. for 1 month on filter paper, and evaluated for their preservation stability in accordance with the following criteria.
 4: Little oozing on filter paper
 3: A little and unclear oozing on filter paper
 2: Rather clear oozing on filter paper
 1: Much oozing on filter paper (2) Evaluation by Bread Production The fat or oil compositions prepared in (1) above and being excellent in preservation stability were used to produce white bread at the blending ratios shown in Table 2.

Strong flour (Nisshin Flour Milling Co., Ltd.), yeast (Oriental Yeast Co., Ltd.), yeast food (Oriental Yeast Co., Ltd.), a monoglyceride formulation (MM100, Riken Vitamin Industry Co., Ltd.), and water were placed in a (10-quart) ball using a vertical mixer (10-quart mixer, a hook was used for stirring, KANTO KONGOKI INDUSTRIAL Co., Ltd.), and mixed at a low speed for 3 minutes and at a high speed for 2 minutes (mixing temperature: 25.0±0.5° C.), followed by fermentation at a temperature of 28° C. and a humidity of 80% for 4.5 hours (final fermentation temperature: 29.0±0.5° C.).

Subsequently, strong flour, sugar, salt, skim milk, and water were placed in the fermented sponge dough, and the whole dough was mixed at a low speed for 3 minutes and at a

TABLE 1

| | Fatty acid composition (%) | | | | | | Glyceride composition (%) | | | | |
| | | | | | | | DAG | | | | |
| | C14:0 | C16:0 | C18:0 | C18:1 | C18:2 | C18:3 | SS | SU | UU | MAG | TAG |
|---|---|---|---|---|---|---|---|---|---|---|---|
| Fat or oil A | | 9.7 | 87.8 | | | | 74.0 | | | 9.1 | 16.9 |
| Fat or oil B | | 3.0 | 1.2 | 38.7 | 47.6 | 8.3 | | 14.8 | 71.2 | 0.5 | 13.5 |
| Fat or oil C | 1.0 | 43.3 | 4.4 | 40.4 | 10.4 | | 20.0 | 40.0 | 20.0 | 0.6 | 19.4 |
| Fat or oil D | | 3.8 | 12.0 | 78.7 | 0.2 | | 3.0 | 27.0 | 58.0 | 1.0 | 11.0 |
| Fat or oil E | | 97.1 | 2.9 | | | | 82.7 | | | 0.8 | 16.5 |
| Fat or oil F | | 4.0 | 1.8 | 59.8 | 21.1 | 12.0 | | | 2.3 | 0.0 | 97.7 |
| Fat or oil G | 1.0 | 43.3 | 4.4 | 40.4 | 10.4 | | 1.1 | 2.4 | 1.3 | 0.0 | 95.2 |
| Fat or oil H | | 10.6 | 87.1 | | | | 2.5 | | | 0.0 | 97.5 |

MAG: Monoacylglycerol
DAG: Diacylglycerol
TAG: Triacylglycerol

Examples 1 to 15 and Comparative Examples 1 to 8

(1) Preparation of Fat or Oil Compositions

The fats or oils A to H were mixed at the ratios shown in Table 3, and melted at 80° C. to prepare homogeneous mixtures. The mixtures were cooled to 25° C. while being kneaded using a chiller (emulsifying kneader, Tama Seiki Kogyo Co., Ltd.), thereby obtaining fat or oil compositions. The resultant fat or oil compositions were preserved at 5° C. for 1 day, successively preserved at 20° C. for 1 day, and then preserved in a refrigerator (5° C.), thereby obtaining fat or oil high speed of 3 minutes. After that, each of the fat or oil compositions was added thereto, and the whole was mixed at a low speed for 3 minutes, at a middle speed for 2 minutes, and at a high speed for 3 minutes (dough temperature after mixing: 26.5±0.5° C.)

Floor time (temperature: 28.0° C., humidity: 80%, 30 minutes) was taken, and it was divided into about 225 g of dough.

Bench time (temperature: 28.0° C., humidity: 80%, 20 minutes) was taken, and the dough was molded using a molder. A baking pan was filled with 6 molded doughs, and fermentation (final proof) was carried out (temperature: 38.0° C., humidity: 80%, 60 minutes).

After completion of the fermentation (final proof), the bread dough was baked in an oven at 205° C. for 40 minutes. After the baking, the bread was cooled at room temperature (20.0° C.) for 45 minutes, placed in a plastic bag, sealed, and further preserved at 20.0° C. for 24 hours, thereby preparing a bread sample.

TABLE 2

|  | (Part(s) by mass) |
| --- | --- |
| (Sponge mixing) | |
| Strong flour | 70 |
| Yeast | 2 |
| Yeast food | 0.1 |
| MM100 | 0.3 |
| Water | 40 |
| (Dough mixing) | |
| Strong flour | 30 |
| Superfine sugar | 5 |
| Salt | 2 |
| Skim milk | 2 |
| Fat or oil composition | 6 |
| Water | 25 |

The dough workability at 20° C. in bread production was evaluated in accordance with the following criteria. In addition, five panelists ate 20 g of the bread samples, the samples were evaluated in accordance with the following criteria, and the average values were calculated as scores. Table 3 shows the results.

(Dough Workability in Bread Production)
  4: Appropriate dough strength and very satisfactory extensibility
  3: Slight dough strength and satisfactory extensibility
  2: Satisfactory extensibility
  1: Low dough strength and poor extensibility (Melt-in-the-Mouth Feeling)
  4: Rapidly melt in mouth during mastication
  3: Melt in mouth during mastication
  2: Slightly sticky
  1: Sticky (Moist Feeling)
  4: Very moist texture
  3: Moist texture
  2: Slight dry feeling
  1: Dry feeling

TABLE 3

|  | Example | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Fat or oil A | 10 | 15 | 20 | 30 | 40 | 45 | 20 | 20 | 10 | 15 | 20 | 30 |
| Fat or oil B | 90 | 85 | 80 | 70 | 60 | 55 | 65 | 50 | 65 | 45 | 55 | 35 |
| Fat or oil C |  |  |  |  |  |  |  |  | 25 | 40 | 25 | 35 |
| Fat or oil D |  |  |  |  |  |  |  |  |  |  |  |  |
| Fat or oil E |  |  |  |  |  |  |  |  |  |  |  |  |
| Fat or oil F |  |  |  |  |  |  | 15 | 30 |  |  |  |  |
| Fat or oil G |  |  |  |  |  |  |  |  |  |  |  |  |
| Fat or oil H |  |  |  |  |  |  |  |  |  |  |  |  |
| DAG (%) | 84.8 | 84.2 | 83.6 | 82.4 | 81.2 | 80.6 | 71.0 | 58.5 | 83.3 | 81.8 | 82.1 | 80.3 |
| Ratio in DAG (%) | | | | | | | | | | | | |
| SS | 8.7 | 13.2 | 17.7 | 26.9 | 36.5 | 41.3 | 20.8 | 25.3 | 14.9 | 23.3 | 24.1 | 36.4 |
| SU | 15.7 | 15.0 | 14.2 | 12.6 | 10.9 | 10.1 | 13.6 | 12.7 | 23.6 | 27.7 | 22.1 | 23.9 |
| UU | 75.6 | 71.9 | 68.1 | 60.5 | 52.6 | 48.6 | 65.6 | 62.0 | 61.6 | 48.9 | 53.8 | 39.7 |
| SS/UU | 0.12 | 0.18 | 0.26 | 0.45 | 0.69 | 0.85 | 0.32 | 0.41 | 0.24 | 0.48 | 0.45 | 0.91 |
| Ratio in TAG (%) | | | | | | | | | | | | |
| SSS/(SSU + SUU) | 0.92 | 1.46 | 2.07 | 3.55 | 5.52 | 6.77 | 2.50 | 3.16 | 0.49 | 0.56 | 0.90 | 1.12 |
| Evaluation of fat or oil composition | | | | | | | | | | | | |
| External appearance | 4 | 4 | 4 | 4 | 3 | 2 | 4 | 4 | 4 | 4 | 4 | 3 |
| Preservation stability | 4 | 4 | 4 | 4 | 4 | 4 | 3 | 2 | 4 | 4 | 4 | 4 |
| Evaluation by bread production | | | | | | | | | | | | |
| Dough workability | 3 | 4 | 4 | 4 | 4 | 4 | 4 | 4 | 2 | 2 | 3 | 2 |
| Melt-in-the-mouth feeling | 4 | 4 | 4 | 4 | 4 | 3 | 4 | 4 | 4 | 4 | 4 | 3 |
| Moist feeling | 4 | 4 | 4 | 4 | 4 | 4 | 3 | 2 | 4 | 4 | 4 | 4 |

|  | Example | | | Comparative Example | | | | | | |
| --- | --- | --- | --- | --- | --- | --- | --- | --- | --- | --- |
|  | 13 | 14 | 15 | 1 | 2 | 3 | 4 | 5 | 6 | 7 | 8 |
| Fat or oil A | 40 |  |  | 3 | 50 |  | 15 | 15 |  |  | 40 |
| Fat or oil B | 30 | 50 | 70 | 97 | 20 | 25 | 40 | 30 |  |  | 30 |
| Fat or oil C | 20 | 40 |  |  | 30 | 75 |  |  | 100 |  |  |
| Fat or oil D |  |  |  |  |  |  |  |  |  | 100 |  |
| Fat or oil E |  | 10 | 30 |  |  |  |  |  |  |  |  |
| Fat or oil F | 10 |  |  |  |  |  | 45 | 55 |  |  |  |
| Fat or oil G |  |  |  |  |  |  |  |  |  |  |  |
| Fat or oil H |  |  |  |  |  |  |  |  |  |  | 30 |
| DAG (%) | 71.4 | 83.3 | 85.0 | 85.6 | 78.2 | 81.5 | 46.5 | 38.2 | 80.0 | 88.0 | 56.2 |

TABLE 3-continued

| Ratio in DAG (%) | | | | | | | | | | | |
|---|---|---|---|---|---|---|---|---|---|---|---|
| SS | 47.1 | 19.5 | 29.2 | 2.6 | 55.0 | 18.4 | 23.9 | 29.1 | 25.0 | 3.4 | 54.1 |
| SU | 17.4 | 28.1 | 12.2 | 16.8 | 19.1 | 41.4 | 12.7 | 11.6 | 50.0 | 30.7 | 7.9 |
| UU | 35.5 | 52.4 | 58.6 | 80.6 | 25.9 | 40.2 | 63.4 | 59.3 | 25.0 | 65.9 | 38.0 |
| SS/UU | 1.33 | 0.37 | 0.50 | 0.03 | 2.12 | 0.46 | 0.38 | 0.49 | 1.00 | 0.05 | 1.42 |
| Ratio in TAG (%) | | | | | | | | | | | |
| SSS/(SSU + SUU) | 2.27 | 0.41 | 3.55 | 0.26 | 2.15 | 0.15 | 2.85 | 3.61 | 0.16 | 0.01 | 19.31 |
| Evaluation of fat or oil composition | | | | | | | | | | | |
| External appearance | 2 | 4 | 4 | 1 | 1 | 1 | 4 | 4 | 1 | 1 | 1 |
| Preservation stability | 4 | 2 | 4 | 1 | 4 | 4 | 1 | 1 | 1 | 4 | 4 |
| Evaluation by bread production | | | | | | | | | | | |
| Dough workability | 3 | 2 | 4 | — | 3 | 1 | — | — | — | 2 | 4 |
| Melt-in-the-mouth feeling | 2 | 4 | 4 | — | 1 | 4 | — | — | — | 4 | 1 |
| Moist feeling | 3 | 4 | 4 | — | 4 | 4 | — | — | — | 4 | 2 |

As is apparent from Table 3, it found that the fat or oil compositions according to the present invention hardly cause deterioration of external appearance and oil separation due to crystallization during preservation as compared to those of Comparative Examples. In addition, the fat or oil compositions according to the present invention provided excellent dough workability in bread production and a satisfactory melt-in-the-mouth feeling and moist feeling of the bread.

Example 16 and Comparative Examples 9 to 11

The fats or oils A to H were mixed at the blending ratios shown in Table 4, and melted at 80° C. to prepare homogeneous mixtures. The mixtures were cooled to 25° C. while being kneaded using the chiller (emulsifying kneader, Tama Seiki Kogyo Co., Ltd.), thereby obtaining fat or oil compositions. The resultant fat or oil compositions were preserved at 5° C. for 1 day and subsequently preserved at 20° C. for 1 day, followed by measurement of the consistency. Table 4 shows the results.

Example 17 and Comparative Examples 12 to 14

The fats or oils A to H were mixed at the blending ratios shown in Table 4, and melted at 80° C. to prepare homogeneous mixtures. The mixtures were subjected to stirring emulsification (7,000 rpm, 10 minutes) with a homomixer (manufactured by PRIMIX Corporation) while 20 parts by mass of water heated to 60° C. were gradually added to 80 parts by mass of the oil phase components, thereby obtaining water-in-oil emulsions. The resultant emulsions were cooled to 25° C. while being kneaded using the chiller (emulsifying kneader, Tama SeikiKogyoCo., Ltd.), thereby obtaining margarines. The resultant margarines were preserved at 5° C. for 1 day, successively preserved at 20° C. for 1 day, and then preserved at 5° C. for 1 day, followed by measurement of the consistency. Table 4 shows the results.

TABLE 4

| | Example | | Comparative Example | | | | | |
|---|---|---|---|---|---|---|---|---|
| | 16 | 17 | 9 | 10 | 11 | 12 | 13 | 14 |
| Fat or oil A | 13 | 15 | 16 | | | 20 | | |
| Fat or oil B | 87 | 85 | | 77 | | | 71 | |
| Fat or oil C | | | | | | | | |
| Fat or oil D | | | | | | | | |
| Fat or oil E | | | | | | | | |
| Fat or oil F | | | 84 | | 80 | 80 | | 76 |
| Fat or oil G | | | | | | | | |
| Fat or oil H | | | | 23 | 20 | | 29 | 24 |
| Ratio in fat or oil | | | | | | | | |
| DAG (%) | 84.4 | 84.2 | 13.8 | 66.8 | 2.3 | 16.6 | 61.8 | 2.3 |
| Ratio in DAG (%) | | | | | | | | |
| SS | 11.4 | 13.2 | 86.0 | 0.9 | 21.4 | 88.9 | 1.2 | 25.6 |
| SU | 15.3 | 15.0 | 0.0 | 17.1 | 0.0 | 0.0 | 17.0 | 0.0 |
| UU | 73.3 | 71.9 | 14.0 | 82.1 | 78.6 | 11.1 | 81.8 | 74.4 |
| SS/UU | 0.2 | 0.2 | 6.1 | 0.0 | 0.3 | 8.0 | 0.0 | 0.3 |
| Ratio in TAG (%) | | | | | | | | |
| SSS/(SSU + SUU) | 1.2 | 1.5 | 19.6 | 2.5 | 25.7 | 25.7 | 3.4 | 32.4 |
| Consistency | | | | | | | | |
| Fat or oil composition | 150 | | 149 | 151 | 150 | | | |
| Margarine | | 151 | | | | 153 | 152 | 152 |
| Amount of saturated fatty acid in fat or oil (%) | 16.7 | 18.6 | 20.9 | 26.2 | 24.7 | 24.7 | 32.0 | 28.5 |

As is apparent from Table 4, it found that the fat or oil compositions according to the present invention and the water-in-oil emulsions including the compositions have the approximately same hardness as the fats or oils including the saturated fatty acid in large amounts of Comparative Examples, despite the small contents of the saturated fatty acid.

The invention claimed is:
1. A fat or oil composition, comprising triacylglycerols and 50 mass % or more of diacylglycerols,
   wherein the diacylglycerols comprise:
   (1) 5 to 50 mass % of a disaturated diacylglycerol (SS) in the diacylglycerols; and
   (2) 35 mass % or less of a monosaturated-monounsaturated diacylglycerol (SU) in the diacylglycerols;
   wherein a mass ratio (SS)/(UU) of a content of the disaturated diacylglycerol (SS) in the diacylglycerols relative to a content of a diunsaturated diacylglycerol (UU) in the diacylglycerols is 1.5 or less, and wherein a mass ratio (SSS)/(SSU+SUU) of a content of a triacylglycerol (SSS), whose constituent fatty acids include saturated fatty acids, relative to a total content of a triacylglycerol (SUU), whose constituent fatty acids include one saturated fatty acid residue and two unsaturated fatty acid residues, and a triacylglycerol (SSU), whose constituent fatty acids include two saturated fatty acid residues and one unsaturated fatty acid residue, in the triacylglycerols is 0.4 or more.

2. The fat or oil composition according to claim 1, wherein the diacylglycerols comprise:
   (1) 5 mass % or more and 48 mass % or less of the disaturated diacylglycerol (SS) in the diacylglycerols; and
   (2) 0 mass % or more and 30 mass % or less of the monosaturated-monounsaturated diacylglycerol (SU) in the diacylglycerols;
   wherein the mass ratio (SS)/(UU) of the content of the disaturated diacylglycerol (SS) in the diacylglycerols relative to the content of the diunsaturated diacylglycerol (UU) in the diacylglycerols is 0.01 or more and 1.2 or less.

3. The fat or oil composition according to claim 1, wherein the diacylglycerols comprise:
   (1) 5 mass % or more and 38 mass % or less of the disaturated diacylglycerol (SS) in the diacylglycerols; and
   (2) 0 mass % or more and 20 mass % or less of the monosaturated-monounsaturated diacylglycerol (SU) in the diacylglycerols;
   wherein the mass ratio (SS)/(UU) of the content of the disaturated diacylglycerol (SS) in the diacylglycerols relative to the content of the diunsaturated diacylglycerol (UU) in the diacylglycerols is 0.03 or more and 0.9 or less.

4. The fat or oil composition according to claim 1, wherein the diacylglycerols comprise:
   (1) 5 mass % or more and 35 mass % or less of the disaturated diacylglycerol (SS) in the diacylglycerols; and
   (2) 5 mass % or more and 15 mass % or less of the monosaturated-monounsaturated diacylglycerol (SU) in the diacylglycerols;
   wherein the mass ratio (SS)/(UU) of the content of the disaturated diacylglycerol (SS) in the diacylglycerols relative to the content of the diunsaturated diacylglycerol (UU) in the diacylglycerols is 0.05 or more and 0.75 or less.

5. The fat or oil composition according to claim 2, wherein the mass ratio (SSS)/(SSU+SUU) of a content of a triacylglycerol (SSS), whose constituent fatty acids include saturated fatty acids, relative to a total content of a triacylglycerol (SUU), whose constituent fatty acids include one saturated fatty acid residue and two unsaturated fatty acid residues, and a triacylglycerol (SSU), whose constituent fatty acids include two saturated fatty acid residues and one unsaturated fatty acid residue, in the triacylglycerols is 0.8 or more and 35 or less.

6. The fat or oil composition according to claim 4, wherein the mass ratio of a content of a triacylglycerol (SSS), whose constituent fatty acids include saturated fatty acids, relative to a total content of a triacylglycerol (SUU), whose constituent fatty acids include one saturated fatty acid residue and two unsaturated fatty acid residues, and a triacylglycerol (SSU), whose constituent fatty acids include two saturated fatty acid residues and one unsaturated fatty acid residue, in the triacylglycerols is 1 or more and 35 or less.

7. The fat or oil composition according to claim 1, wherein the diacylglycerols comprise:
   (4) 35 to 95 mass % of the diunsaturated diacylglycerol (UU) in the diacylglycerols.

8. The fat or oil composition according to claim 3, wherein the diacylglycerols comprise:
   (4) 45 to 90 mass % of the diunsaturated diacylglycerol (UU) in the diacylglycerols.

9. The fat or oil composition according to claim 3, wherein the diacylglycerols comprise:
   (4) 55 to 87 mass % of the diunsaturated diacylglycerol (UU) in the diacylglycerols.

10. The fat or oil composition according to claim 1, wherein a content of the diacylglycerols is from 65 to 95 mass %, and a content of the triacylglycerols is from 5 to 34.9 mass %.

11. The fat or oil composition according to claim 2, wherein the content of the diacylglycerols is from 75 to 95 mass %, and the content of the triacylglycerols is from 5 to 24.9 mass %.

12. The fat or oil composition according to claim 4, wherein the content of the diacylglycerols is from 80 to 85 mass %, and the content of the triacylglycerols is from 5 to 20 mass %.

13. The fat or oil composition according to claim 1, wherein a content of monoacylglycerols is 10 mass % or less.

14. The fat or oil composition according to claim 1, wherein a content of monoacylglycerols is from 0.01 to 8 mass % or less.

15. The fat or oil composition according to claim 1, wherein a content of free fatty acids is 3.5 mass % or less.

16. The fat or oil composition according to claim 1, wherein a content of free fatty acids is from 0.01 to 1.5 mass % or less.

17. The fat or oil composition according to claim 1, which has a consistency of from 30 to 250.

18. A water-in-oil emulsion, comprising the fat or oil composition according to claim 1, and having a mass ratio between an oil phase and an aqueous phase of from 10:90 to 90:10.

19. A water-in-oil emulsion, comprising the fat or oil composition according to claim 1, and having a mass ratio between an oil phase and an aqueous phase of from 30:70 to 70:30.

* * * * *